Sept. 21, 1965 A. TREPS 3,208,010

START-STOP OSCILLATOR HAVING RECTIFIER TO OBTAIN BIAS FROM THE OUTPUT VOLTAGE

Filed Nov. 24, 1961

United States Patent Office 3,208,010
Patented Sept. 21, 1965

3,208,010

START-STOP OSCILLATOR HAVING RECTIFIER TO OBTAIN BIAS FROM THE OUTPUT VOLTAGE

André Treps, Clichy-sous-Bois, Seine-et-Oise, France, assignor to Compagnie des Freins et Signaux Westinghouse, Paris, France Filed Nov. 24, 1961, Ser. No. 154,642
Claims priority, application France, Nov. 28, 1960, 845,162
3 Claims. (Cl. 331—117)

Figure 1:
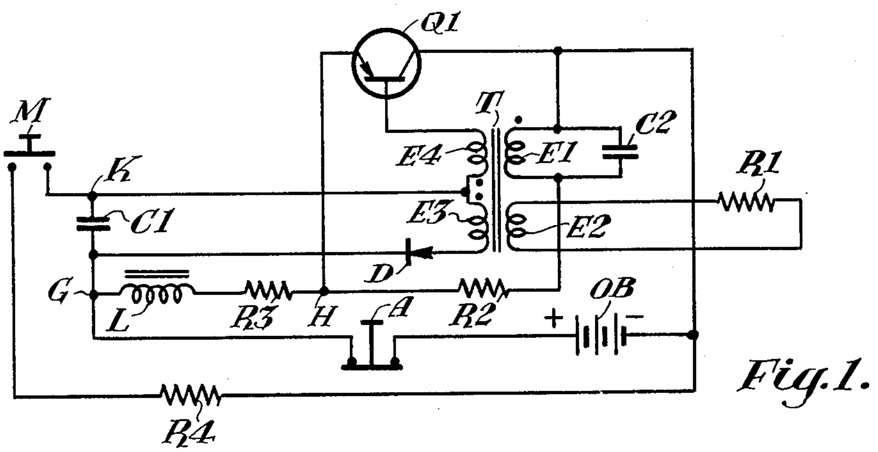

My invention pertains to an electronic memory device having fail-safe operation. More particularly, my invention pertains to an electronic oscillator arrangement capable of registering and retaining a record of the occurrence of an external action by changing from a first to a second condition or state, and holding in that second state. This oscillator memory arrangement returns to its first or safe condition in the event of any failure or fault in the apparatus or circuitry.

A need for memory devices having a fast registry action exists in many phases of the electrical art. A particular example is the field of railway signaling where there are frequent requirements for registering trains, moving at high speeds, as they pass a particular point, or as they enter a particular section of railroad track. The use of memory devices frequently also requires fail-safe operation. In other words, a memory device must provide the same output under any type of fault condition as the output which it provides under the safe condition of registry. In the specific example of railway signaling, the memory device under fault conditions must provide the same output or indication as that which it provides when a train is occupying an associated stretch of railway track. Many of the prior devices and proposals in this field of registration and/or memory lack this safety feature. Such a memory device need have only two conditions, that is, it need have only an "on" and an "off" state or condition. If used as a digital memory or storage device, these conditions may also be designated as the 1 and the 0 values used in binary and similar digital storage arrangements. Under some special circumstances, there may be a requirement for a period of delay prior to the registry of the occurrence of the action which is to be stored as a memory in the device provided.

Accordingly, an object of my invention is a fail-safe memory device for registering and storing the occurrence or nonoccurrence of a selected event.

Another object of my invention is an electronic memory device for storing an indication of the occurrence of a momentary event.

A further object of my invention is a memory device comprising an electronic oscillator which registers by its oscillatory or non-oscillatory condition the occurrence or nonoccurrence, respectively, of a selected event.

A still further object of my invention is an electronic oscillator which is held in a non-oscillatory state to store one condition of information input and is actuated into oscillation to register and store a second condition of information input.

It is also an object of my invention to provide an electronic memory device which provides a delay period prior to the storing or registering of the occurrence of a momentary event.

Still another object of my invention is an electronic memory device normally holding in one condition or state and being actuated into a second condition to register the occurrence of a particular event, holding in the second condition to remember the occurrence of that event until reset by the occurrence of a converse event.

An additional object of my invention is an oscillator memory device normally held in a first or safe indication condition, actuated by the occurrence of a first unique input signal into a second condition, and restored to its safe condition by the occurrence of a second unique input signal or by the occurrence of an internal circuit fault.

Other objects, features, and advantages of my invention will become apparent from the following specification when taken in connection with the accompanying drawings.

In practicing my invention, I provide in the memory device an electronic oscillator. Various types of such oscillators may be used, but the principal showing is of a transistorized oscillator, preferably of the tuned collector, shunt-fed type using a single transistor. However, a vacuum tube oscillator may also be used, and an equivalent circuit for such is also shown in the drawings. The oscillator, by its oscillatory and non-oscillatory conditions, provides two memory states and may thus store a two element item of information. The oscillator is normally held in its non-oscillatory condition by a bias voltage supplied from a voltage divider connected across the operating direct current source and actually applied across the emitter-base circuit of the transistor. This bias voltage may be considered as one signal input and the non-oscillatory condition of the oscillator as the "off" or "safe" condition. Another input signal circuit is provided comprising a resistor and capacitor arrangement connected in series with a normally open contact and the direct current source. The occurrence of the event to be registered closes this contact, completing the ciruit for charging the capacitor by the direct current source. The charge on this capacitor is applied across the emitter-base circuit of the transistor so poled as to provide a bias signal of opposite polarity to that of the first input or holding bias signal. This second input signal provides sufficient bias to override the first input and actuate the transistor into its conducting condition. With the transistor in its conducting condition, oscillation begins, thus placing the oscillator arrangement in its second condition to register the input marking the occurrence of the event to be registered. The resistor-capacitor network may be provided with a charging time delay period of whatever length desired.

The capacitor is also provided with a second energizing circuit, which comprises an additional winding coupled to the feedback and output transformer of the oscillator. This additional winding is energized during the oscillatory condition of the oscillator arrangement and energizes the capacitor through a half wave rectifier or other form of diode. This arrangement is so connected as to maintain the same polarity charge on the capacitor as that initially created by the closing of the normally open contact. This charge is maintained at sufficient level to so bias the transistor as to maintain oscillation indefinitely. Thus, the oscillator stores or remembers the occurrence of the second input signal. The normally open contact may thus be reopened without changing the storage condition. Finally, to provide a return to the "off" condition, a normally closed contact is included in the circuit from the direct current source to the oscillator. The opening of this contact by the occurrence of a second event, which is of the reverse nature, interrupts the supply of energy and halts the oscillation of the system. When this contact recloses, the first input or blocking bias signal only is restored, the capacitor having discharged during the interval that the contact was open. Thus, the action of the normally closed contact acts as a final input to restore the first input signal condition. The oscillator now holds in this first condition, that is, its non-oscillatory condition until another occurrence of the second input. Safety is provided in that any circuit or apparatus failure in the arrangement halts the oscillation, returning the system to its "off" or "safe" condition in which no oscillation occurs. A conventional oscillator output circuit is provided to provide an external indication of the memory storage.

Referring now to the drawings, FIG. 1 is a diagrammatic circuit arrangement of one form of memory device embodying the transistorized arrangement of my invention.

Figure 2:
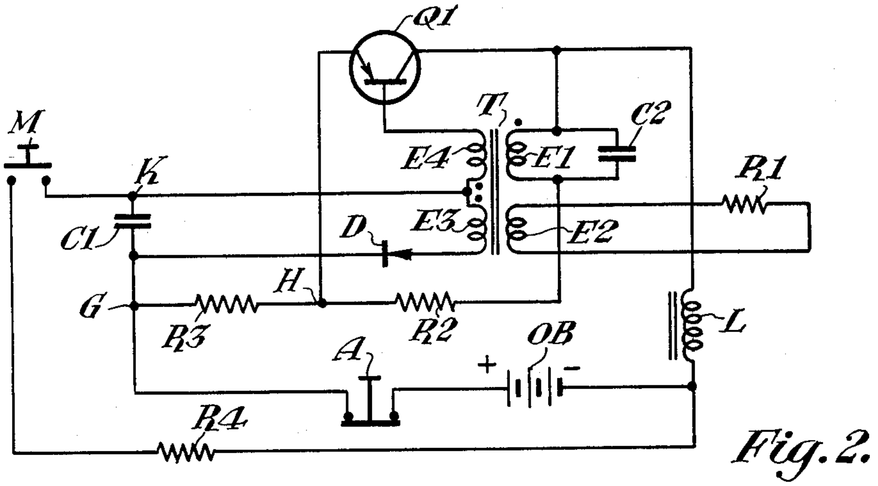

FIG. 2 is a similar circuit illustration showing a second circuit form embodying my invention, differing from the first form in the details of the oscillator portion of the circuit.

Figure 3:
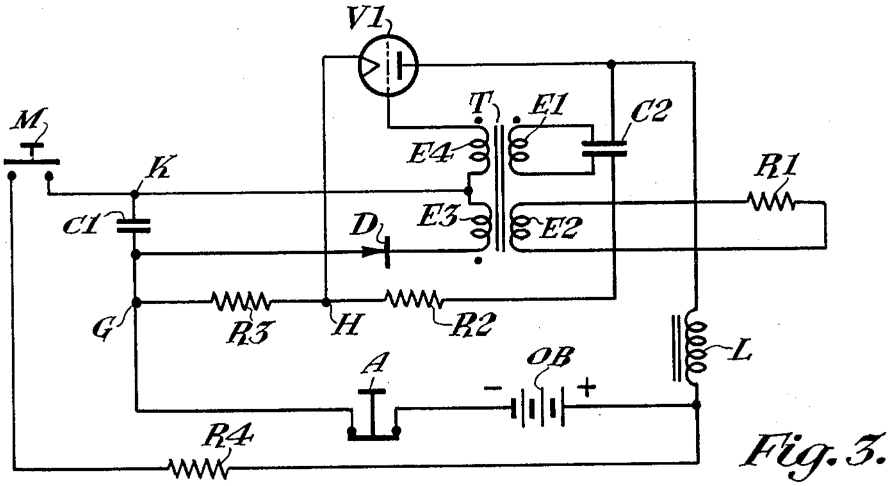

FIG. 3 also shows in diagrammatic arrangement a third form of a memory device embodying my invention, using a triode type vacuum tube in a circuit arrangement similar to that of FIG. 2 but with the necessary modifications to accommodate the use of a vacuum tube.

In each of the drawings, similar reference characters are used to designate similar parts of the apparatus.

I shall now describe in greater detail the arrangements of the system embodying my invention and shall then point out the novel features thereof in the appended claims.

Referring to FIG. 1 of the drawings, the basic element of the memory device shown therein is the oscillator which comprises the transistor Q1 and a feedback transformer T. Transistor Q1 is shown by conventional symbol as being of the PNP junction type, having an emitter, a base, and a collector, each shown in conventional manner. Obviously, the circuit arrangement may be modified for the use of an NPN junction transistor, if desired. Transformer T is provided with four windings inductively coupled. Winding E1 is part of the oscillator tuned circuit which is tuned by capacitor C2 and the inductance of winding E1 to a preselected frequency. The oscillator, as shown, is of the tuned collector type connected in shunt fed, common collector arrangement. Feedback to drive the oscillation is obtained between windings E1 and E4 of transformer T. A third winding E2 coupled into the transformer provides an output for the oscillator to the load shown conventionally as a resistor R1. Resistor R1 is a conventional showing of the load which may be some form of indicator or even a relay which provides an indication or signal of the periods of oscillation and non-oscillation of the oscillator means of the memory device. The basic oscillator circuit connections are typical for the form of oscillator used and need no detailed explanation for an understanding by those skilled in such circuits. The utility of the remaining winding E3 of transformer T will appear shortly in the following discussion.

Energy for the present arrangement, particularly for driving the oscillator, is obtained from the operating battery OB, shown by conventional symbol. Of course, other forms of direct current sources, such as a rectifier energized from an alternating current source, may also be used. Battery OB is connected in series with a pushbutton switch A which acts as one of the inputs for the memory system here shown. Switch A is shown as a pushbutton in order to provide a conventional showing. In actual practice, input A is provided by a normally closed contact device in which the contact is opened by the action which requires a safe condition of the memory device. As a specific example, in a railway signaling arrangement, this action which requires the assumption of a safe condition by the memory device may be the entry of a train into a track section which must be remembered in order to prevent the entry of a second train. The contact of switch A is biased, such as by a spring, to return to its normally closed position at the termination of the event which is being registered. A second input for the memory system is provided by a similar device shown as a pushbutton switch M. Switch M is provided with a normally open contact which is closed by the occurrence of the action which is to be remembered and thus stored or registered in the arrangement. The contact of switch M is biased, by a spring or in any other well known manner, to return to its normally open position. Again, a specific example of the control of switch M may be to record or detect the exit of a train from a track section. Such an action allows the memory device to assume its permissive condition, providing a signal of permissive nature for a following train. In the present form, herein shown, this permissive signal is the initiation and continued oscillation of the oscillator means and the resulting output into load R1.

With switch A in its normally closed position, a bias circuit is complete between the positive and the negative terminals of battery OB. This circuit is traced from the positive terminal over the closed contact of switch A, inductor winding L, resistors R3 and R2, and winding E1 of transformer T to the negative terminal of the battery. Current flow in this circuit creates a voltage drop across the network comprising inductor L and resistor R3. In other words, the current flow creates a voltage drop between points G and H of the traced circuit. Since inductor L is primarily a block for alternating current in the emitter-base circuit, most of this voltage drop occurs in resistor R3. Under the conditions shown, point G is more positive than point H, the nature of this voltage drop being obvious. This potential drop creates a positive bias signal or condition on the base of transistor Q1 relative to the associated emitter. The emitter of transistor Q1 is directly connected in an obvious manner to circuit point H, while the base of the transistor is connected to circuit point G through capacitor C1 and winding E4. Thus, the more positive condition of point G is transferred to the base of transistor Q1 so that a positive bias over the corresponding emitter is created. Since transistor Q1, as shown, is of the PNP junction type, this bias condition holds the transistor in its nonconducting condition so that no oscillation occurs in the oscillator network.

I shall now assume that the contact of switch M is closed by the occurrence of the event which it is desired to register and store in the memory device. The closing of the contact of switch M completes an initial circuit for charging capacitor C1, this circuit extending from the positive terminal of battery OB over the closed contact of switch A and through capacitor C1 to point K and thence over the now closed contact of switch M and resistor R4 to the negative terminal of battery OB. The parameters of this last traced circuit are so designed that the potential of the charge on capacitor C1 at the termination of its charging period is greater than the voltage drop across inductor L and resister R3 in the previously traced biasing circuit. In other words, circuit point K now has a more negative potential than does circuit point H. Because of the connection from point K through winding E4, this charge on capacitor C1 creates a negative potential on the base of transistor Q1 with respect to the potential of the corresponding emitter. Under this biasing condition, transistor Q1 changes to its conducting state so that oscillation is initiated in the oscillator circuit arrangement. This action occurs since the oscillator here shown is of the self-excited type, that is, oscillation is initiated as soon as the proper conditions exist within the circuit arrangement to support such oscillation.

A voltage is now induced in winding E3 of transformer T, this winding being coupled into the transformer so that a voltage is induced therein having the same frequency as that to which the oscillator is tuned. The output from winding E3 is passed through the half wave rectifier or diode D and thus maintains, by this half wave rectified output, the charge existing on capacitor C1. This charging circuit, as is obvious from an inspection of the drawing, includes winding E3, rectifier D, and capacitor C1. Even though switch M now returns to its normal condition in which its contact is open, oscillation is maintained by the oscillator arrangement which is now self biased through winding E3 and capacitor C1. This oscillation condition continues indefinitely to store a memory of the closing of switch M.

If switch A is now operated to open its contact so that the connection to the positive terminal of battery OB is interrupted, all energy is removed from the arrangement and operation of the system immediately halts, oscillation ceasing. Capacitor C1 rapidly dissipates any residual charge through the circuit consisting of inductor L, resistor R3, the emitter-base path of transistor Q1, and winding E4. Thus when switch A recloses its contact, only the original bias voltage existing between circuit points G and H is applied to transistor Q1 which is thus retained in its nonconducting condition, as was initially described. During the time that the oscillator arrangement is in its oscillatory condition, the voltage induced in output winding E2 causes a flow of current through load resistor R1 to provide such external indication of the oscillatory condition as is desired.

Referring now to FIG. 2, it is noted that the circuit arrangement is of similar design except that inductor L is connected in the lead from the collector of transistor Q1 to the negative terminal of battery OB. The oscillator is thus now of the common emitter arrangement, but there is no change in its general operation. In fact, the operation and function of the circuit of FIG. 2 is identical with that of FIG. 1 and is shown merely to provide an illustration of a second form of the transistor circuitry embodying my invention.

The circuit of FIG. 3 is similar to that of FIG. 2 but uses a triode type vacuum tube V1 in place of transistor Q1 of the other circuits. The connections to battery OB and diode D are properly adjusted to allow for the different polarity requirements of the vacuum tube with respect to bias potentials and operating voltages. The operation and function of the circuit of FIG. 3 are identical, within the limitations of the operation of the vacuum tube, to that of the circuits of FIGS. 1 and 2. This third circuit embodying my invention is shown primarily to illustrate a form using a vacuum tube. One slight additional change in the connections to capacitor C2 may be noted, although equivalent arrangements may be used in either of the other circuits shown. In order to provide additional safety in the event that a fault occurs within the capacitor, and to avoid the oscillator circuit becoming tuned at some other frequency so that operation of the circuit could continue, capacitor C2 is provided with four leads. Interruption of any portion of the capacitor circuit thus destroys the feedback network of the oscillator and halts operation of the memory device, restoring the output to the safe condition.

If desired, a time delay may be inserted between the closing of the contact of switch M and the actual starting of the oscillation to record that event. This time delay may be obtained by adjusting the charging rate of capacitor C1, which is accomplished by adjusting the resistor-capacitor network which includes resistor R4. By varying resistor R4, the charging time of capacitor C1 may be lengthened so that a measurable time interval occurs between the closing of switch M and the beginning of oscillation within the oscillator means. Since the discharge path of C1, as previously traced, provides for a rapid dissipation of any charge existing on this capacitor, the arrangement will enforce a new and complete delay period each time switch A opens and recloses, even though switch M retains its contact closed. As a specific example of the use of such an arrangement, the device may be used to indicate the approach of a train to a highway crossing where it is frequently desirable to limit the time interval of signal display to that which will provide a safe but not extensive period of warning.

I shall now briefly review the operation of the circuit arrangement of my invention referring only to FIG. 1 since the operation of each of the circuit arrangements is identical. Assuming the condition of switches A and M to be that shown, there is no oscillation occurring so that an "off" or "safe" signal is provided by the memory device. In other words, there is no output voltage induced in winding E2 and thus no flow of current through load resistor R1 to a provided signal indication. Under these conditions, transistor Q1 is supplied with a bias signal from the biasing circuit including resistors R3 and R2, the bias signal providing a positive potential on the base of transistor Q1 when taken with respect to the potential on the emitter.

When switch M closes its contact for a brief interval, which action comprises a first signal input to be recorded, capacitor C1 is charged over the circuit including the closed contact of switch M and resistor R4. Circuit point K then shifts to a more negative potential than circuit point H. This changes the bias signal supplied to transistor Q1 so that the potential of the base is now more negative than that existing on the emitter and the transistor changes to its conducting condition. As previously described, the charging of capacitor C1 to its full signal voltage may be delayed for an appreciable time by the adjustment of resistor R4 in the charging circuit. With transistor Q1 in its conducting condition, oscillation begins and a signal output occurs from winding E2 through resistor R1. Capacitor C1 is then held in its charged condition by the output of winding E3 which is coupled into transformer T as part of the feedback network. Thus, even though switch M reopens its contact, circuit point K is held at its negative potential and oscillation within the arrangement continues indefinitely. Thus the occurrence of the closing of the contact of switch M is remembered by the device by its continued oscillation and is indicated by the output into load resistor R1.

The occurrence of the second action, to open switch A, interrupts the supply of energy to the circuit arrangement from battery OB, causing oscillation to cease and removing the active or permissive signal displayed by resistor R1. Capacitor C1, under these conditions, rapidly discharges so that the reclosing of the contact of switch A does not restore the oscillatory condition of the arrangement. Instead, the initial bias signal is reapplied to transistor Q1 so that its base is of a more positive potential than the emitter and the transistor resumes its nonconducting condition. The halting of the oscillation records the occurrence of the second action, that is, the opening of switch A. This restores the "safe" or "off" signal condition of the arrangement. It is this safe condition which the memory device also assumes in the event that a fault occurs in any of the circuit connections or in any of the apparatus so that no dangerous indication can be displayed.

It is thus obvious that the arrangeemnt of my invention provides a fail-safe memory device which will record and store, that is, remember, the occurrence of a particular event for such period of time as may be desired. The occurrence of a second event, of the opposite nature, removes the storage of the first event occurrence and returns the arrangement to a safe condition. Since it is a removal of energy which causes the return to the safe condition, the circuit holding in that condition upon restoration of the energy, the device provides a fail-safe action which prevents the occurrence of any fault condition from causing the display of a permissive signal condition.

Although I have herein shown and described but three forms of circuit arrangement embodying my invention, it is to be understood that various changes and modifications may be made therein within the scope of the appended claims without departing from the spirit and scope of my invention.

Having thus described by invention, what I claim is:

1. Fail-safe memory apparatus, comprising:

(a) a transistor having base, emitter and collector electrodes, (b) said base and collector electrodes being inductively coupled, the collector portion of the coupling being tuned to a selected frequency to establish an oscillatory feedback circuit when said transistor is in its conducting state, (c) a source of direct current energy and a normally closed first contact connected in series through said emitter and collector electrodes for supplying operating energy to said apparatus, (d) an input circuit for said transistor connected across said emitter and base electrodes, (e) an output circuit coupled across said emitter and collector electrodes for indicating when the feedback circuit network is oscillating, (f) a biasing circuti network including a voltage divider impedance connected across said source and having connections to said input circuit to normally bias said transistor to its non-conducting state, (g) a capacitor, (h) a charging circuit for said capacitor including a normally open second contact and said source connected in series for charging said capacitor with a preselected polarity, (i) another biasing circuit including said capacitor and so connected to said transistor from input circuit as to oppose the normal bias with said preselected polarity to transfer said transistor to its conducting condition when said second contact is closed, (j) a second charging circuit including a half-wave rectifier and a winding inductively coupled across said collector and emitter electrodes and connected for maintaining said preselected polarity charge on said capacitor after oscillation begins and said second contact reopens, (k) said second charging circuit being effective to maintain the oscillatory condition of the apparatus until said first contact momentarily opens.

2. Fail safe signal memory apparatus, comprising:

(a) a transistor having base, emitter, and collector electrodes, (b) a transformer with four inductively coupled windings, (1) a first winding being connected in multiple with a first capacitor to create a tuned circuit, (2) the emitter-collector path of said transistor and said first winding-first capacitor path being connected in a series circuit arrangement, (c) a source of direct current energy connected for supplying operating energy to said series circuit arrangement, (1) a second winding of said transformer being connected to the base of said transistor for supplying at times feedback energy to maintain oscillation in said series circuit arrangement, (d) a first and a second contact normally open and normally closed respectively, (1) each contact being briefly operable to an opposite condition in consecutive order in response to a series of two predetermined successive events, (e) a first biasing circuit energized by said source and connected for supplying a reverse bias potential from said source to the emitter-base path of said transistor to normally block oscillation in said series circuit oscillator arrangement, (f) a second capacitor, (g) a first charging circuit including said first contact and said source for charging said second capacitor with a preselected polarity when said first contact is closed, (h) a second biasing circuit including said second capacitor connected across said emitter-base path of said transistor with said preselected polarity opposing said reverse bias potential, (1) said second biasing circuit creating a forward bias in said transistor for initiating oscillation within said oscillator arrangement, (i) a second charging circuit including a third winding of said transformer and a half-wave rectifier connected for charging said second capacitor with said preselected polarity when said series circuit arrangement is in its oscillatory condition, thus maintaining said forward bias condition on said transistor after said first contact reopens, (j) said second contact being inserted in the connections from said source to said series circuit arrangement for deenergizing said apparatus to halt oscillation when said second contact opens, (1) said reverse bias condition being restored on said transistor when said second contact recloses, (k) an output circuit including an indicator and a fourth winding of said transformer for recording the period of oscillation of said series circuit arrangement.

3. Fail safe signal memory apparatus, comprising:

(a) a transistor having base, emitter, and collector electrodes, (b) a transformer with four inductively coupled windings, (1) a first winding being connected in multiple with a first capacitor to create a tuned circuit, (c) a source of direct current energy, (1) said source, the emitter-collector path of said transistor, and said first winding connected in series, the second winding of said transformer, and the base of said transistor, being interconnected to form an oscillator arrangement having a preselected frequency, (d) a first biasing circuit including a potential divider arrangement connected across said source and having connections across the emitter and base electrodes of said transistor so poled as to reverse bias said transistor to hold the apparatus non-oscillatory, (e) a second capacitor, (f) a normally open switch operable to a closed position in response to a first predetermined event, (g) a first charging circuit for said second capacitor including said source and said normally open switch, (h) a second biasing circuit including said second capacitor and having connections across said emitter and base electrodes so poled as to forward bias said transistor to initiate oscillation when said normally open switch is closed, (1) said second biasing circuit also at times serving as a discharge circuit for said second capacitor, (i) a second charging circuit for said second capacitor including a third winding of said transformer and a rectifier poled to maintain the same polarity charge on said second capacitor when said oscillator arrangement is in its oscillatory condition and thus self bias said transistor to continue operation to store a record of the occurrence of said first predetermined event, (j) an output circuit including the fourth winding of said transformer and an indicator to record the oscillatory condition of said oscillator arrangement, (k) a normally closed switch interposed in the connections to said source, (1) said normally closed switch opening in response to a subsequent predetermined event to halt all operation of said apparatus to store a record of the occurrence of said subsequent event.

References Cited by the Examiner

UNITED STATES PATENTS

| | | | |
|---|---|---|---|
| 2,318,061 | 5/43 | Dailey | 331—185 X |
| 2,454,845 | 11/48 | Sherman et al. | 331—185 |
| 2,676,251 | 4/54 | Scarbrough | 331—149 X |

OTHER REFERENCES

Article by Dorrell in IBM Technical Disclosure Bulletion, vol. 3, No. 9, February 1961.

Article in QST, page 54, December 1961.

ROY LAKE, *Primary Examiner.*

JOHN KOMINSKI, *Examiner.*

UNITED STATES PATENT OFFICE

CERTIFICATE OF CORRECTION

Patent No. 3,208,010 September 21, 1965

André Treps

It is hereby certified that error appears in the above numbered patent requiring correction and that the said Letters Patent should read as corrected below.

Column 7, line 27, for "circuti" read -- circuit --; column 8, line 2, strike out "oscillator"; line 44, strike out the comma.

Signed and sealed this 22nd day of February 1966.

;EAL)

ttest:

RNEST W. SWIDER testing Officer

EDWARD J. BRENNER

Commissioner of Patents